United States Patent [19]

Stein

[11] Patent Number: 4,988,741

[45] Date of Patent: Jan. 29, 1991

[54] CONTROLLED RELEASE COMPOSITIONS AND USE

[75] Inventor: Judith Stein, Schenectady, N.Y.

[73] Assignee: General Electric Company, Schenectady, N.Y.

[21] Appl. No.: 441,733

[22] Filed: Nov. 27, 1989

[51] Int. Cl.$^5$ .................... C08G 77/04; C08G 77/06
[52] U.S. Cl. .................... 522/31; 522/170; 522/99; 528/14; 528/25
[58] Field of Search .................... 522/99, 31, 170; 528/25, 14

[56] References Cited

U.S. PATENT DOCUMENTS

| | | | |
|---|---|---|---|
| 4,026,705 | 5/1977 | Crivello et al. | 522/31 |
| 4,279,717 | 7/1981 | Eckberg et al. | 522/99 |
| 4,547,431 | 10/1985 | Eckberg | 428/413 |

Primary Examiner—Marion E. McCamish
Assistant Examiner—Susan Berman
Attorney, Agent, or Firm—William A. Teoli; James C. Davis, Jr.; William H. Pittman

[57] ABSTRACT

UV curable controlled release compositions are provided. An epoxy silicone fluid and a cationically polymerizable styrene compound, such as vinyl anisole, which is substantially miscible with the epoxy silicone fluid, is used in combination with an effective amount of a photoactive aromatic onium salt.

4 Claims, No Drawings

CONTROLLED RELEASE COMPOSITIONS AND USE

CROSS REFERENCE TO RELATED APPLICATIONS

Reference is made to copending application Stein, Ser. No. 07/369,799 for Method For Coating Substrates With UV Curable Epoxy Silicone Compositions, filed June 22, 1989 and Stein, Ser. No. 07/369,900 for Substantially Odor-Free, UV Curable Organopolysiloxane Release Coating Compositions and Coating Method filed June 22, 1989, where both applications are assigned to the same assignee as the present invention and incorporated herein by reference.

BACKGROUND OF THE INVENTION

The present invention relates to UV curable controlled release coating compositions utilizing an epoxy silicone fluid, a cationically polymerizable styrene compound, such as α-methyl styrene or a derivative thereof or a p-substituted styrene compound, and a photoactive aromatic onium salt, such as a diaryliodonium hexafluorometalloid salt.

Prior to the present invention, silicone release coatings were widely used to render various surfaces non-adherent. Non-adherent silicone treated paper is often used to support labels contacting a pressure-sensitive adhesive (PSA) prior to the use of such labels. In addition, non-adherent surfaces are often necessary in industrial packaging.

Silicones have been widely recognized for their value as release coatings particularly with respect to their use with PSAs. The release coating industry is also searching for ways to synthesize release coating compositions which can be converted to cured release coatings having a predictable variation in release characteristics when contacted with PSAs, referred to hereinafter as "controlled or differential release".

Certain coating compositions utilizing epoxy or acrylic functional groups as modifiers of the release properties of cured silicone resins are taught by U.S. Pat. No. 4,576,999. UV cured epoxysilicone polymers having controlled release also are discussed in copending application Ser. No. 171,498, filed Mar. 21, 1988, utilizing condensed organosiloxy units substituted with esterified benzoyl groups. Another method for modifying release characteristics of UV curable epoxy functional silicones is taught in U.S. Pat. No. 4,547,431, resulting from the addition of epoxy monomers.

Controlled or differential release of organopolysiloxane resins is also discussed in copending application Ser. No. 225,986, filed July 29, 1988. Organopolysiloxanes are modified with monovalent phenolic radicals having from 6 to 26 carbon atoms, monovalent acrylic organic radicals, or monovalent epoxy functional organic radicals. These modified silicones have been found to have controlled release. The incorporation of the phenolic groups onto the organopolysiloxane backbone is achieved by an SiH to vinyl addition reaction catalyzed by a platinum catalyst. Although effective controlled release results are achieved, it has been found that residual amounts of unreacted allylphenol used to incorporate phenolic groups into the resin, often impart an undesirable phenolic odor to the silicone release resin.

Improved substantially odor free UV curable compositions are shown in copending application Ser. No. 07/369,900. Although various UV curable epoxy silicone compositions have been provided, significant effort is being expended by the silicone industry to find additional silicone release coating compositions capable of providing silicone coatings with controlled release characteristics.

SUMMARY OF THE INVENTION

The present invention is based on the discovery that certain cationically polymerizable aromatic compounds such as, α-methylstyrenes, or a p-substituted styrene compound, for example, p vinyl anisole, can provide effective controlled release characteristics to epoxy silicones when blended with such materials along with an effective amount of an aromatic onium salt, such as a diaryliodoniumhexafluoroantimonate salt. A substantially uniform solventless blend can be provided. Simultaneous cationic polymerization of both the epoxy silicone fluid and the cationically polymerizable alkenyl substituted aromatic compound can be achieved when the resulting blend is exposed to ultraviolet light. Unlike epoxy monomers, which can require levels of 30% by weight or greater of the release coating composition, to achieve a satisfactory controlled release effect with the epoxy silicone fluid, the cationically polymerizable styrene of the present invention can be used at 1% to 26% by weight levels of the release coating composition.

STATEMENT OF THE INVENTION

There is provided by the present invention, a UV curable controlled release composition comprising by weight, (A) 100 parts of an epoxy silicone fluid consisting essentially of about 20 to about 100 condensed siloxy units which constitute about 84 to about 94 mole percent of diorganosiloxy units of the formula,

$(R)_2SiO$ and 6 to about 16 mole of epoxy organosiloxy units of the formula,

$R R^1 SiO$ (B) from about 1 to about 35 parts of a cationically polymerizable styrene compound selected from the class consisting of α-methylstyrene compounds, p-substituted styrene compounds and mixtures thereof, and (C) an effective amount of a photoactive aromatic onium salt, where R is selected from the same or different C(1-13) monovalent organic radicals and $R^1$ is a monovalent epoxy functional organic radical.

Radicals included within R are, for example, C(1-8)alkyl radicals, such as methyl, ethyl, propyl, butyl, pentyl, alkenyl radicals such as vinyl, alkyl, cycloaliphatic radicals, for example trifluoropropyl, cyanoethyl; aryl radicals, such as phenyl, tolyl, xylyl, haloaryl, for example, chlorophenyl. Radicals included within $R^1$ are, for example, ethylepoxycyclohexyl, propylglycidyl ether, and 1-methyl-4-isopropyl epoxycyclohexyl.

The polyarylonium hexafluorometalloid salts which can be used in the practice of the present invention include group VIa aromatic sulfonium salts as shown by U.S. Pat. Nos. 4,058,401 and 4,161,478, Crivello, which are incorporated herein by reference and diaryliodonium hexafluorometalloid salts shown by Crivello U.S. Pat. No. 4,173,551 which is incorporated herein by reference.

Some of the triarylsulfonium salts are, for example, triphenysulfonium hexafluoroarsenate, triphenysulfonium hexafluoroantimonate and triarylsulfonium hexafluorophosphate. Among the diaryliodonium salts which can be used are, for example, diphenyliodonium hexafluoroarsenate, and diphenyliodonium hexafluorophosphate. In addition to the aforementioned arylonium salts, there also can be used arylonium salts selected from the class consisting of hexafluorophosphates, hexafluoroarsenates and hexafluoroantimonates having at least one aryl radical substituted with a nuclear bound-$OR^2$ group, where $R^2$ is a $C_{(8-20)}$alkyl radical. Reference is made to copending application Ser. No. 171,063, filed Mar. 21, 1988 for Non-Toxic Aryl Onium Slats, UV Curable Coating Compositions and Packaging Use, Crivello et al, which is incorporated herein by reference, which shows additional polyarylonium hexafluorometalloid salts which can be employed in the practice of the present invention. An effective amount of the aryl onium salts which can be used, is for example, from 0.1% to 2% by weight and preferably 0.25% to 1% by weight based on the weight of release coating composition.

Epoxy silicones used in the practice of the present invention can be made by effecting reaction between epoxide monomers having ethylenic unsaturation and an organohydrogen polysiloxane in the presence of a catalytic amount of a precious metal such as a platinum catalyst. Included within the ethylenically unsaturated epoxy monomers which can be employed to make the epoxysilicones used in the practice of the present invention are commercially available materials such as 1-methyl-4-isopropenylcyclohexene oxide, 2,6-dimethyl-2,3-epoxy-7-octene, 1,4-dimethyl-4-vinylcyclohexene oxide and vinylcyclohexene monoxide. Vinylcyclohexene oxide is the preferred ethylenically unsaturated epoxide which can be used.

Addition between the ethylenically unsaturated epoxide and the SiH functional groups of the organohydrogenpolysiloxane can be effected in accordance with the procedure shown by Eckberg U.S. Pat. No. 4,279,717, employing an effective amount of a platinum metal catalyst In order to maintain the desired mole percent range of epoxy functionality in the epoxy-silicone, as set forth in the Statement of the Invention, there can be used various organohydrogenpolysiloxanes which preferably are methylhydrogenpolysiloxane fluids. For example, in instances where the 10 mole percent of epoxy functionality is required, a methylhydrogenpolysiloxane having a chain length of about 100 chemically combined siloxy units consisting essentially of about 90 mole percent of dimethylsiloxy units, 8 mole percent of methylhydrogensiloxy units chain-stopped with dimethylhydrogensiloxy units can be used. In instances where higher mole percents of epoxy functionality are desired, methylhydrogen polysiloxane having a shorter chain length of methylhydrogen siloxy units and dimethylsiloxy units and optionally having dimethylhydrogensiloxy chain-stopping units can be used. In instances where lower mole percents of epoxy functionality in the epoxy silicone are desired, methylhydrogenpolysiloxanes having longer chain lengths can be employed.

α-methyl styrene compounds which can be used as controlled release additives (CRA's) are, for example, α-methyl styrene, and α-methylstyrene derivatives, such as, o, m, or p, methyl substituted α-methylstyrene; o, m, or p, phenyl substituted α-methyl styrene; o, m, or p methoxy substituted α-methylstyrne; o, m or p, phenoxy substituted α-methylstyrene.

Among the p-substituted styrene compounds which can be used as CRA's are 4-methoxystyrene (vinyl anisole) and 4-ethoxy styrene; 4-$C_{(1-8)}$ alkyl styrene, such as, the corresponding 4-methyl, 4-ethyl and 4-propyl; 4-$C_{(6-13)}$ aryl styrene, such as the corresponding 4-phenyl styrene.

In the practice of the present invention, the UV curable coating composition can be made by blending together the epoxy silicone fluid, the cationically polymerizable organic compound or "CRA" and the aromatic onium salts. Although the order of the addition of the various ingredients is not critical, it is preferred to blend the epoxy silicone with the CRA prior to the incorporation of the aromatic onium salt.

It is also preferred to avoid the use of an organic solvent. The mixture can be stirred and coated onto the substrate with a Gravure roller which will facilitate the dispersion of the various ingredients. In particular situations however, a volatile organic solvent can be used, such as a mixture of equal parts of hexane and acetone.

Coating compositions of the present invention can be applied to various substrates by conventional means such as by roller coating, spraying and dip coating. The silicone release compositions can be applied, for example, on paper, metals, foils, glass, as well as polymer coated papers such as polyolefin coated kraft paper, polyolefin films, such as polyethylene and polypropylene films and polyester films.

Cure of the applied coatings can be effected by photopolymerization of the UV curable epoxysilicone compositions upon exposure to a radiation source within the ultraviolet and visible regions Some of the radiation sources are, for example, mercury, xenon, carbon arc and tungsten filament lamps, sunlight, etc. Exposures can be from less than one second to 10 minutes or more depending upon the materials to be polymerized and photocatalysts employed. Electron beam irradiation also can be used.

In order that those skilled in the art will be better able to practice the present invention, the following examples are given by way of illustration and not by way of limitation. All parts are by weight unless otherwise specified.

EXAMPLE 1

A series of blends were prepared of 1 part of an epoxy silicone having a viscosity of 250 centipoise at 25° C. and consisting essentially of condensed dimethylsiloxy units and about 16 mole percent of methyl-β-(3,4 epoxycyclohexenyl)ethyl siloxy units with 0.1 to 0.3- part of vinyl anisole. The blends were diluted to a mixture of 20% by weight solids with a solvent blend of equal parts of hexane and acetone. There was added to the mixture, sufficient diphenyliodonium hexafluoroantimonate to produce photo curable release composition having 3% by weight of the onium salt. Coatings were applied to polyethylene kraft using a coating rod and allowed to dry. The treated paper was cured by exposure to a mercury vapor lamp at 200–300 watts/inch at 50 feet per minute. Release numbers were obtained against an aggressive solvent cast SBR (sytrene-butadiene-rubber) pressure sensitive adhesive at a pull of 300 inch/minute at 180° angle. Release was measured in units of grams/2 in. The following results were obtained after a shelf period of 4 weeks.

| Parts of Anisole | Release (4 wks) |
| --- | --- |
| — | 35–45 |
| .1 | 55–70 |
| .2 | 145–175 |
| .3 | 185–225 |

The above results show that a variation in the weight level of vinyl anisole in the epoxy silicone composition can significantly influence the release characteristics of an aggressive solvent cast SBR pressure sensitive adhesive after a shelf period of 4 weeks.

Although the above example is directed to only a few of the very many variables which can be employed in the practice of the present invention, it should be understood that the present invention is directed to a much broader variety of epoxy silicone compositions as well as cationically polymerizable styrene compounds and aromatic onium salts as set forth in the description preceding this example.

What is claimed is:

1. A UV curable controlled release composition comprising by weight,
   (A) 100 parts of an epoxy silicone fluid consisting essentially of about 20 to about 100 condensed siloxy units which constitute about 84 to about 94 mole percent of diorganosiloxy units of the formula,

where R is selected from the same or different $C_{(1-13)}$ monovalent organo radicals and 6 to about 16 mole of epoxy organosiloxy units of the formula,

where $R^1$ is a monovalent epoxy functional organic radical,
   (B) from about 1 to about 35 parts of a cationically polymerizable styrene compound selected from the class consisting of α-methylstyrene compounds, p-substituted styrene compounds and mixtures thereof, and
   (C) 0.1% to 2% by weight based on the weight of the UV curable control release composition of a photoactive aromatic onium salt.

2. A UV curable controlled release composition in accordance with claim 1, where the cationically polymerizable styrene compound is vinyl anisole.

3. A UV curable controlled release composition in accordance with claim 1, where the photoactive aromatic onium salt is a diphenyliodonium hexafluoroantimonate salt.

4. A UV curable controlled release composition in accordance with claim 1, where the epoxy silicone consists essentially of condensed dimethylsiloxy units and methyl-β-(3,4 cyclohexenylepoxy)ethylsiloxy units.

* * * * *